United States Patent Office 3,833,625
Patented Sept. 3, 1974

3,833,625
PROCESS FOR THE SELECTIVE OXIDATION OF KETONES
Jean-Noel Marie Bertrand, Tervueren, and Joseph Marie Vaerman, Brussels, Belgium, assignors to Labofina S.A,. Brussels, Belgium
No Drawing. Filed Oct. 27, 1971, Ser. No. 193,199
Claims priority, application Belgium, Jan. 4, 1971, 98,262
Int. Cl. C07c 51/28
U.S. Cl. 260—408    11 Claims

ABSTRACT OF THE DISCLOSURE

A process for the oxidation of ketones in the liquid phase which comprises subjecting an asymmetrical ketone R—CO—R′, where R is a paraffinic or olefinic hydrocarbon radical containing at least 2 carbon atoms, substituted or not, and R′ is a saturated aliphatic radical containing not more than 2 carbon atoms, to oxidation in the presence of molecular oxygen at a partial pressure of 0.1 to 50 atmospheres and in the presence of a manganese salt, the molar ratio of manganic salt to ketone being higher than 0.1, at a temperature from 20 to 130° C., with the selective formation of the acid R—COOH wherein R is as defined above.

---

This invention relates to a process for the selective oxidation in the liquid phase of asymmetrical ketones into fatty acids with preferential breaking of the molecule between the carbonyl group and the radical having the shorter chain.

Many processes are known for the oxidation of ketones into acids, these processes being distinquishable from each other primarily by the nature of the catalyst or by the choice of the oxidizing agent. In most cases, the oxidation of a ketone having the formula R—CO—R′, where R is a hydrocarbon radical having a greater carbon chain length than that of R′, proceeds with breaking of the chain between the longer carbon chain radical (or radical R) and the carbonyl group. Thus, the oxidation of methylethylketone gives mainly acetic acid. Generally, oxidation with breaking between the carbonyl group and the shorter radical occurs only in some particular cases, such as with ketones where the R radical is highly branched.

With the known processes, the reaction rates usually are quite slow. Therefore the capacity of a plant is low and consequently the net cost of the produced acids is substantially increased. When attempts have been made to improve the reaction rates, i.e. by working under a high oxygen pressure and by using a cobalt catalyst, gaseous products such as CO and $CO_2$ are formed in high proportions, because of the breaking of the carbon chain of the initial ketone between the carbonyl group and each of the R and R′ radicals of such ketone. For example, formic and propionic acids are formed simultaneously by oxidation of methylpropylketone under such conditions of high oxygen pressure and using the known cobalt catalysts.

The prior art processes have another drawback when they are applied to ketones having a radical R or R′ with a relatively high length of carbon chain. A progressive breaking of such long chains arises during the oxidation. Thus, such a reaction gives a mixture of acids, without preferential production of a specific acid.

For industrial purposes, it is particularly advantageous for the oxidation of ketones to result in the preferential selective formation of only one acid and, still more advantageous to result in the formation of the acid resulting from the breaking of the carbon chain between the carbonyl group and the shorter carbon chain radical.

The present invention provides a process whereby this selectivity is fulfilled. Moreover, according to this process, the oxidation rate at a given concentration of ketone is higher than with prior art processes and this improvement is not detrimental to the selectivity. Furthermore, this process may be easily applied to a wide variety of ketones and is particularly valuable for the manufacture of higher fatty acids, diacids and other difunctional derivatives.

The present invention is a process for the oxidation in the liquid phase of ketones which comprises subjecting an asymmetrical ketone R—CO—R′, wherein R is a paraffinic or olefinic hydrocarbon radical containing at least 2 carbon atoms, substituted or not, and R′ is a saturated aliphatic radical containing not more than 2 carbon atoms, to oxidation in the presence of molecular oxygen at a partial pressure of 0.1 to 50 atmospheres and in the presence of a manganic salt, the molar ratio of manganic salt to ketone being higher than 0.1, at a temperature from 20 to 130° C., with the selective formation of the acid R—COOH, wherein R is as defined above.

The process of this invention may be applied to a wide variety of ketones. The oxidation selectivity is observed irrespective of the chain length of R. Indeed, the breaking of the chain is drastically reduced when the oxidation is carried out under the process of the present invention. This advantage of the present process is also observed when the chain of the radical R includes substituents, even when some of these substituents could direct the oxidation in an undesired way. Thus, the radical R may be substituted by a halogen or an hydroxyl radical linked to a carbon atom at a position other than the alpha position relative to the carbonyl group. Moreover, the radical R may be substituted at the end of the chain opposed to that linked to the carbonyl group by a functional group such as —OH, —COOH, —COOR″ (R″ being a hydrocarbon radical, —COCl or a halogen. Therefore, the process of the invention may be used in the manufacture of difunctional derivatives having various applications, namely in the synthetic resin and plasticizer fields.

So that the reaction of the present invention may be performed in the liquid phase, a solvent is used in which the substrate and the manganese salt are soluble and which is reasonably inert at the reaction conditions. Any fatty acids whose dissociation constant is lower than $10^{-3}$ may be used. Preferably, the same acid as that to be formed by the reaction is employed, provided that such acid is substantially stable.

The manganese salts which are used in the present process include the manganic salts and more particularly those derived from carboxylic acids. While any manganic carboxylate may be used, it is preferred to use the manganic salt of the acid which is used as solvent.

The reaction mixture must be practically anhydrous in order to avoid precipitation of the manganic salt which would thereby become less active.

Manganic carboxylates have already been suggested as oxidation catalysts for ketones, in an amount which may reach 10% based on the weight of the starting ketone. However, it has been found that by using the manganic salt in a substantially higher amount, according to the present invention, not only the reaction rate is increased but unexpectedly, the ketone R—CO—R′ is selectively oxidized into the acid R—COOH. This selectivity becomes apparent when the molar ratio of manganic salt to ketone is approximately 0.1. However, full selectivity is most apparent when this ratio is at least 0.5:1. The upper limit of this ratio depends on the solubility of the manganic salt in the reaction mixture, but generally this ratio is between 0.5:1 and 10:1, more particularly between 1:1 and 7:1. Preferably, this ratio is between 1:1 and 4:1, with oxidation improvement relating to selectivity and rate being not so substantial in most cases, when this ratio is higher than 4:1.

As the oxidation reaction proceeds, the manganic salt is reduced into manganous salt but generally, a regeneration into manganic salt occurs by co-oxidation with intermediate products formed during the reaction. In some cases, a particularly convenient process is to carry out the oxidation of the starting ketone R—CO—R' in the presence of another ketone, more particularly a symmetrical ketone. Another particularly suitable process for the regeneration of the manganic salt comprises performing the oxidation reaction in the presence of a cobalt salt, besides the manganese salt. To this end, the cobalt salt is used in a molar ratio of between 1 and 10% of the manganic salt. Fresh manganic salt may also be added during the reaction in order to keep the manganic salt to ketone ratio within the above defined values.

The reaction temperature may vary within a relatively large range, i.e., between about 20° and 150° C., according to the reactivity of the starting ketone, and manganic salt to ketone ratio and other such aspects. In most cases, however, the reaction temperature will be between 60 and 100° C. These values are given for atmospheric pressure, it being understood that they will be higher when working under pressure.

Selective oxidation by the process of the present invention, is performed in the presence of a gas containing molecular oxygen. This gas may be pure oxygen or a mixture of oxygen with other gases inert under the conditions of the reaction. Air may be used, for example. The oxygen partial pressure will lie between 0.1 and 50 atmospheres, although in particular instances, it is possible to apply pressures outside this range. A low partial pressure may be sufficient, provided that particularly efficient stirring be ensured. On the other hand, pressures higher than 50 atmospheres may be applied, but they do not result in an improvement such as to justify additional plant investment. In most cases, an oxygen partial pressure of 0.2 to 10 atmospheres is advantageously applied.

Under the above specified conditions, the process of the present invention has a double advantage. The asymmetrical ketone R—CO—R' is preferentially oxidized into the acid R—COOH and, moreover, this ketone in admixture with a paraffinic hydrocarbon and/or alcohol is preferentially oxidized, while the paraffinic hydrocarbon and the alcohol do not react to any significant extent.

It is to be understood that various modifications can be made in the above described process without departing from the scope of this invention. It is also to be understood that this process may be used in the oxidation of a mixture of asymmetrical ketones, the molar ratio of manganic salt to ketones being higher than 0.1:1.

These features and other characteristics of the process of the present invention will be apparent from the following examples which are given by way of illustration and without limitation:

EXAMPLE 1

A 1 litre reactor was charged with 500 ml. of a solution of 0.2 mole of manganic acetate in anhydrous acetic acid. This solution was heated up to 90° C. under a stream of oxygen and 0.05 mole of 2-heptanone was introduced at once. Then 0.5 mole/hr. of oxygen and 0.05 mole/hr. of 2-heptanone were introduced during 6 hours, while keeping the reaction mixture under atmospheric pressure.

A sample of the reaction mixture was taken off. An aqueous solution of ferrous salt was added to the sample and the reaction products along with the unreacted ketone were extracted with ether. The extract was analyzed by vapor-phase chromatography.

The 2-heptanone was oxidized selectively into caproic acid according to the reaction

The reaction rate of the 2-heptanone was 0.1 mole per hour and per litre of reaction mixture with a stationary concentration in ketone of 0.1 mole/litre.

The molar yield of caproic acid based on the converted 2-heptanone was 64%.

The mixture of the acids formed by oxidation of the 2-heptanone contained 74% by volume of caproic acid or $C_6$-acid, 17% by volume of $C_5$-acid, 5% by volume of $C_4$-acid and 4% by volume of $C_3$-acid.

By way of comparison, a similar experiment was carried out but with the use of manganic acetate at a concentration of only 0.001 mole/litre.

The molar yield in caproic acid was only 21% and the distribution of the acids was the following: $C_6$:33%; $C_5$:48%; $C_4$:12%; $C_2$:7%. Moreover, the reaction rate was about 3 times lower.

By working according to the process of the present invention with a molar ratio of manganic acetate to ketone of 4:1, or with a weight ratio of about 200%, the reaction rate is substantially increased and the oxidation reaction is directed to the formation of caproic acid.

EXAMPLE 2

The operation of Example 1 was repeated except that 0.1 mole of an equimolecular mixture of 2-heptanone and 2-butanol was introduced at the start and 0.1 mole/hr. of this mixture was added during 6 hours.

The molar yield in caproic acid was 63% calculated on the reacted 2 heptanone.

The added 2-butanol remained practically unreacted.

A similar experiment with a mixture of 2-heptanone and isopropanol has given the same results which illustrates that the asymmetrical ketone is selectively oxidized from a mixture of such ketone with an alcohol.

EXAMPLE 3

The operation of Example 1 was repeated except that 2-undecanone

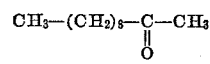

was used instead of 2-heptanone.
Decanoic acid

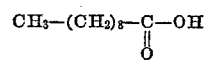

was obtained with a yield of 66%.

The distribution of the fatty acids formed during the oxidation was the following:

$C_{10}$:72%; $C_9$:18%; $C_8$:5%; $C_7$:3%; $C_6$:2%.

The reaction rate of the ketone was 0.1 mole/litre/hour, with a stationary concentration of ketone of 0.094 mole/litre.

To the contrary, with a concentration of manganic acetate of 0.001 mole/litre, the molar yield of decanoic acid is only 26% and the distribution of the obtained acids was the following:

$C_{10}$:46%; $C_9$:46%; $C_8$:5%; $C_7$:2%; $C_6$:1%

The reaction rate of the ketone is about 3 times lower.

EXAMPLE 4

The operation of Example 1 was repeated, but with 11-chloro-2-undecanone

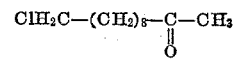

instead of 2-heptanone.
Chlorodecanoic acid

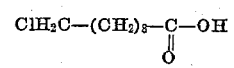

was obtained with a yield of 68%.

EXAMPLE 5

The operation of Example 1 was repeated, but with the use of methylisobutylketone

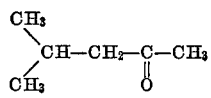

instead of 2-heptanone.

The concentration of manganic acetate was 0.4 mole/litre.

Isovaleric acid

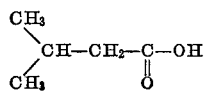

was obtained with a molar yield of 88%.

To the contrary, with a concentration of manganic acetate of 0.001 mole/litre, the molar yield in isovaleric acid was only 46%.

EXAMPLE 6

The operation of Example 1 was repeated but starting from 3-heptanone

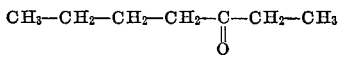

instead of 2-heptonone.

With a concentration of manganic acetate of 0.4 mole/litre, the distribution of the acids was the following:

$C_5$:42%; $C_4$:21%; $C_3$:37%

To the contrary, with a concentration of manganic acetate of 0.001 mole/litre, the distribution was:

$C_5$:25%; $C_4$:32%; $C_3$:43%

EXAMPLE 7

A 1 litre reactor was charged with 500 ml. of a solution of 0.2 mole of manganic propionate in propionic acid. The mixture was heated up to 90° C. under a stream of oxygen and while stirring there was added at once 0.05 mole of 2-heptanone. Then 0.05 mole/hr. of 2-heptanone and 0.5 mole/hr. of oxygen were added over a 1 hour period.

Caproic acid was obtained with a molar yield of 66% calculated on the converted 2-heptanone.

The distribution of the $C_6$ to $C_3$ fatty acids produced by this oxidation was the following:

$C_6$:76%; $C_5$:16%; $C_4$:5%; $C_3$:3%

EXAMPLE 8

The operation of Example 1 was repeated but with a mixture of 0.4 mole/litre of manganic acetate and 0.002 mole/litre of cobaltic acetate.

After a 6 hour run, 96% of the initial manganic salt was still present, against 66% in the absence of cobaltic salt. It is seen that the manganic salt is regenerated "in situ" and with a better efficiency with the cobalt salt.

The same result was obtained with the use of cobaltous salt instead of cobaltic salt.

The selectivity and the yield in caproic acid were like to that obtained in Example 1.

EXAMPLE 9

A 1 liter reactor was charged with 500 ml. of a solution of 0.2 mole of manganic acetate in anhydrous acetic acid. The solution was heated up to 80° C. under a stream of oxygen and 0.1 mole of mesityl oxide added at once. Then 0.5 mole/hr. of oxygen and 0.1 mole/hr. of mesityl oxide were then added over a 2½ hr. period.

Beta, beta'-dimethylacrylic acid was obtained with a molar yield of 50% calculated on the reacted ketone, the reaction being:

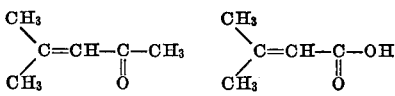

EXAMPLE 10

The operation of Example 1 was repeated in a series of experiments, but using instead of the 2-heptanone, the substituted derivatives

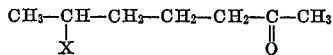

where X is respectively chlorine, fluorine and a hydroxyl radical.

The corresponding acids

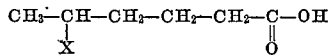

were obtained with the following molar yields, calculated on the converted ketone

| Nature of the substituent: | Molar yield, percent |
|---|---|
| Cl | 67 |
| F | 64 |
| OH | 66 |

EXAMPLE 11

The operation of Example 1 was repeated but with the use of different amounts of manganic acetate, in order to vary the molar ratio of manganic acetate to ketone.

For each of the experiments, the percentage of $C_6$ acid in the mixture of produced acids was determined and the results were the following:

| Molar ratio—Manganic acetate: ketone: | Percentage of $C_6$ acid |
|---|---|
| 0.01 | 33 |
| 0.1 | 50 |
| 0.5 | 60 |
| 1 | 65 |
| 2 | 70 |
| 4 | 74 |
| 7 | 74 |

These experiments show that the oxidation selectivity is improved when the molar ratio is higher than 0.1 and is more particularly improved when this ratio is about 4. An increase in this ratio up to the value 7 does not result in a substantial improvement in the selectivity.

EXAMPLE 12

A 1 litre reactor was charged with 500 ml. of a solution of 0.2 mole of manganic acetate in anhydrous acetic acid and this solution heated up to 90° C. under a stream of oxygen. Then 0.05 mole of 4-oxopentanoic acid was charged at once while stirring and thereafter 0.5 mole/hr. of oxygen, 0.05 mole/hr. of 4-oxopentanoic acid and 0.05 mole/hr. of acetone, were added over 6 hours.

Succinic acid was obtained, according to the following reaction:

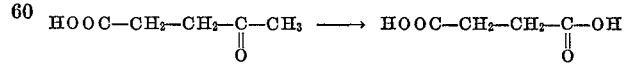

The molar yield of such acid was 58%, calculated on the converted 4-oxopentanoic acid.

EXAMPLE 13

A 1 litre reactor was pressured with air up to 20 atm. The reactor was charged with 500 ml. of a solution of 0.2 mole of manganic acetate in anhydrous acetic acid. The solution was heated up to 110° C., while stirring. Under an air stream of 5 mole/hr., there was added 0.15 mole of 2-heptanone at once and then 0.15 mole/hr. of 2-heptanone over 6 hours.

Caproic acid was obtained with a molar yield of 63% calculated on the converted ketone.

The mixture of acids formed during this oxidation of 2-heptanone contained 71% $C_6$-acid, 20% $C_5$-acid, 6% $C_4$-acid and 3% $C_3$acid.

EXAMPLE 14

The operation of Example 1 was repeated, but using methyl-isopropenylketone instead of 2-heptanone.

Methacrylic acid was formed selectively according to the reaction:

$$H_2C=\underset{\underset{CH_3}{|}}{C}-\underset{\underset{O}{\|}}{C}-CH_3 \longrightarrow H_2C=\underset{\underset{CH_3}{|}}{C}-\underset{\underset{O}{\|}}{C}-OH$$

EXAMPLE 15

The operation of Example 1 was repeated, but using pinacolone instead of 2-heptanone and by heating up to 70° C. instead of 90° C.

Pivalic acid was formed selectively according to the reaction:

$$H_3C-\underset{\underset{CH_3}{|}}{\overset{\overset{CH_3}{|}}{C}}-\underset{\underset{O}{\|}}{C}-CH_3 \longrightarrow H_3C-\underset{\underset{CH_3}{|}}{\overset{\overset{CH_3}{|}}{C}}-\underset{\underset{O}{\|}}{C}-OH$$

What is claimed is:

1. A process for the oxidation of an asymmetrical ketone having the formula

R—CO—R′ wherein R is a substituted paraffinic or olefinic hydrocarbon radical containing at least 2 carbon atoms, said hydrocarbon radical being substituted at a carbon atom therein other than a carbon atom in the alpha position relative to the carbonyl group by a halogen or hydroxyl group, or substituted at the carbon atom of said hydrocarbon radical opposite to that linked to the carbonyl group by a functional group —COOH, —COCl or —COOR″ wherein R″ is a hydrocarbon radical, and R′ is a saturated aliphatic radical containing not more than 2 carbon atoms, to selectively produce a carboxylic acid of the formula

R—COOH wherein R is defined as above, said process comprising subjecting said asymmetrical ketone to oxidation in the liquid phase in the presence of molecular oxygen at a partial pressure of 0.1 to 50 atmospheres, at a temperature of from about 20 to 130° C. and in the presence of a manganese salt, the molar ratio of manganic salt to said ketone being greater than about 0.1:1.

2. The process of Claim 1, wherein said molar ratio of manganic salt to ketone is greater than about 0.5:1.

3. The process of Claim 1, wherein said molar ratio of manganese salt to ketone is between about 1:1 and 4:1.

4. The process of Claim 1, wherein the reaction is carried out in the presence of a solvent which is substantially inert in the reaction conditions.

5. The process of Claim 4, wherein the solvent is a carboxylic acid whose dissociation constant is lower than $10^{-3}$.

6. The process of Claim 1 wherein the manganese salt is the salt of a carboxylic acid.

7. The process of Claim 1 wherein the molar ratio of manganese salt to ketone is between 0.5:1 and 10:1.

8. The process of Claim 7 wherein said molar ratio is between 1:1 and 7:1.

9. The process of Claim 1 wherein said manganese salt is used in admixture with a cobalt salt.

10. The process of Claim 9 wherein the cobalt salt is used in a molar amount of between 1 and 10% of said manganese salt.

11. The process of Claim 1 wherein the oxidation is carried out in the presence of a symmetrical ketone.

References Cited

UNITED STATES PATENTS

| | | | |
|---|---|---|---|
| 2,005,183 | 6/1935 | Flemming et al. | 260—537 X |
| 2,051,470 | 8/1936 | De Simó et al. | 260—539 |
| 2,241,487 | 5/1941 | Slotterbeck | 260—541 |
| 2,299,013 | 10/1942 | Flemming | 260—537 |

ELBERT L. ROBERTS, Primary Examiner

D. G. RIVERS, Assistant Examiner

U.S. Cl. X.R.

260—413, 526 N, 535 R, 537 P, 537 S, 539, 540